Oct. 13, 1959  R. L. TAYLOR  2,908,849
ELECTROLYTIC CAPACITORS
Filed March 21, 1958
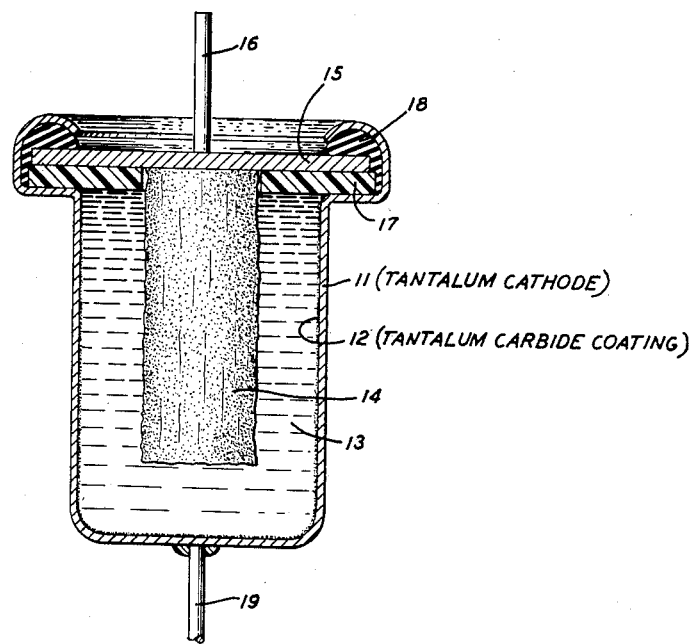
INVENTOR
R. L. TAYLOR
BY
ATTORNEY

2,908,849

ELECTROLYTIC CAPACITORS

Raymond L. Taylor, Berkeley Heights, N.J., assignor to Bell Telephone Laboratories, Incorporated, New York, N.Y., a corporation of New York Application March 21, 1958, Serial No. 723,066

4 Claims. (Cl. 317—230)

This invention relates to electrolytic capacitors and relates, particularly, to electrolytic capacitors having cathodes made in whole or in part of tantalum carbide.

Electrolytic capacitors generally comprise an anode of a film-forming metal, a cathode, and an electrolyte. Common anode materials are, for example, such film-forming metals as tantalum, zirconium, titanium, and niobium. Electrolytes of various kinds can be employed. One which has proved particularly successful is an aqueous lithium chloride electrolyte taught in Patent 2,368,688, granted February 6, 1945, to R. L. Taylor. For cathode materials, however, choice has been limited.

A substance used as a cathode is preferably electrically and chemically inert. To the present, silver has been found the material most adaptable to use as a cathode in electrolytic capacitors. Silver makes good electrical contact with the electrolyte solutions, is comparatively inexpensive, and can be worked and soldered easily.

However, silver shows some tendency to react with the chloride ion-containing electrolytes most desirable for use in capacitors forming silver chloride. A metallic short is produced in some instances when the spacing between the anode and the cathode is bridged by silver chloride over the surface of which metallic silver has been formed by cathodic reduction or electrodeposited by leakage current.

One method of averting such a result is the replacement of the silver cathode with a cathode of some other material. Ideally, a noble metal such as gold or platinum might be used, but the cost of such materials is prohibitive. Another method consists of electroplating the surface of the silver cathode with a noble metal such as rhodium, particularly in conjunction with a buffering of the capacitor electrolyte by the addition of boric acid.

From the standpoint of corrosion resistance, tantalum is another good material for cathode manufacture. Normally, however, tantalum is covered with a natural oxide film which prevents the tantalum from making good electrical contact with the electrolyte.

In the present invention cathodes are used which are formed of tantalum carbide or which have tantalum carbide surfaces.

Tantalum carbide is resistant to corrosition in capacitor electrolytes and makes good electrical contact with electrolyte solutions. A cathode composed entirely of tantalum carbide is thus suitable, but may be inconvenient for use in applications requiring complex cathode shapes because of the difficulty involved in working the material mechanically. In such cases, cathodes of more malleable elemental tantalum can be used with some portion of the cathode surface which is in contact with the electrolyte converted to tantalum carbide. Both tantalum and tantalum carbide are corrosion resistant, and the presence of the conducting tantalum carbide portion of the cathode obviates the conduction difficulties normally found with tantalum.

In the accompanying drawing is shown a side elevation in section of an electrolytic capacitor having a tantalum-tantalum carbide cathode.

The drawing shows a cup-shaped container of tantalum 11 having tantalum carbide 12 on its surface in contact with electrolyte 13. The container serves as the cathode of the capacitor. Suspended within the container is a slug 14 of film-forming metal, as for instance porous tantalum, which is the capacitor anode, and which is coated with an tantalum oxide dielectric film, produced for instance by anodizing. Slug 14 is affixed to disc 15, also of metal, preferably tantalum. Wire 16, on which slug 14 is crimped, is in electrical contact with disc 15 and slug 14, and is the anode lead. Disc 15 is kept out of electrical contact with the cathodic container by annular ring 17 of an insulating material such as polytetrafluoroethylene, for example. Ring 17, disc 15 and slug 14 are sealed within the cathode container by sealing composition 18, which may be a rubber base or plastic material. The cathode container edges are crimped over to seal the container tightly. A drop of solder is used to anchor negative lead 19 on the bottom of the cathode container.

The tantalum carbide film can be produced on the tantalum container which is to become the cathode by the following method though other methods may be apparent to those skilled in the art. The inside of the tantalum container is coated with graphite as, for example, commercially available "aquadag." The coated container is heated under a vacuum of one micron or better to a temperature of approximately 1,600° C. to 1,800° C. and then immediately allowed to cool. The resulting reaction between the graphite coating and the tantalum container forms a continuous tantalum carbide coating on the inside of the container.

What is claimed is:

1. An electrolytic capacitor comprising a film-forming metal anode and a cathode having a tantalum carbide surface in contact with a chloride ion-containing electrolyte.

2. An electrolytic capacitor in accordance with claim 1 wherein the cathode is formed of tantalum having a tantalum carbide surface in contact with the electrolyte.

3. An electrolytic capacitor in accordance with claim 1 wherein the cathode is formed of tantalum carbide.

4. An electrolytic capacitor comprising a container of tantalum, a chloride ion-containing electrolyte within said container, and a film-forming metal anode immersed in said electrolyte, said tantalum container having a tantalum carbide inner surface in contact with said electrolyte.

References Cited in the file of this patent

UNITED STATES PATENTS

| 1,508,987 | Rider | Sept. 16, 1924 |
|---|---|---|
| 2,060,022 | Brennan | Nov. 10, 1936 |
| 2,085,413 | Bloomenthal | June 29, 1937 |
| 2,846,624 | Hilton | Aug. 5, 1958 |